(12) United States Patent
Hyde et al.

(10) Patent No.: US 7,447,392 B2
(45) Date of Patent: Nov. 4, 2008

(54) PLASMON GATE

(75) Inventors: Roderick A. Hyde, Redmond, WA (US);
Edward K. Y. Jung, Bellevue, WA (US);
Nathan P. Myhrvold, Medina, WA
(US); John Brian Pendry, London
(GB); Clarence T. Tegreene, Bellevue,
WA (US); Lowell L. Wood, Jr.,
Bellevue, WA (US)

(73) Assignee: Searete LLC

( * ) Notice: Subject to any disclaimer, the term of this patent is extended or adjusted under 35 U.S.C. 154(b) by 0 days.

(21) Appl. No.: 11/974,344

(22) Filed: Oct. 12, 2007

(65) Prior Publication Data

US 2008/0095493 A1 Apr. 24, 2008

Related U.S. Application Data

(63) Continuation-in-part of application No. 11/649,710, filed on Jan. 4, 2007, and a continuation-in-part of application No. 11/471,288, filed on Jun. 19, 2006, now Pat. No. 7,366,373.

(51) Int. Cl.
*G02B 6/12* (2006.01)
*G02B 6/26* (2006.01)

(52) U.S. Cl. .......................................... 385/12; 385/26

(58) Field of Classification Search ................... 385/16, 385/39
See application file for complete search history.

(56) References Cited

U.S. PATENT DOCUMENTS

| 5,825,799 | A | 10/1998 | Ho et al. | |
|---|---|---|---|---|
| 6,163,637 | A | 12/2000 | Zirngibl | |
| 6,437,887 | B1 * | 8/2002 | Usami et al. | 359/108 |
| 6,539,156 | B1 * | 3/2003 | Dickson et al. | 385/129 |
| 6,614,960 | B2 * | 9/2003 | Berini | 385/39 |
| 6,741,782 | B2 * | 5/2004 | Berini | 385/130 |
| 6,862,396 | B2 * | 3/2005 | Dickson et al. | 385/141 |
| 7,043,134 | B2 * | 5/2006 | Berini et al. | 385/147 |
| 7,286,221 | B2 * | 10/2007 | Caracci et al. | 356/300 |
| 2002/0131667 | A1 * | 9/2002 | Berini | 385/11 |
| 2003/0042487 | A1 * | 3/2003 | Sarychev et al. | 257/53 |
| 2003/0059147 | A1 * | 3/2003 | Berini | 385/2 |
| 2003/0147616 | A1 * | 8/2003 | Dickson et al. | 385/129 |
| 2004/0008943 | A1 * | 1/2004 | Berini | 385/39 |
| 2004/0046963 | A1 * | 3/2004 | Lackritz et al. | 356/445 |
| 2005/0058425 | A1 * | 3/2005 | Berini et al. | 385/147 |
| 2005/0249667 | A1 * | 11/2005 | Tuszynski et al. | 424/9.3 |
| 2005/0275934 | A1 * | 12/2005 | Ballato et al. | 359/321 |
| 2006/0072875 | A1 * | 4/2006 | Bhagavatula et al. | 385/30 |
| 2006/0145326 | A1 * | 7/2006 | Tran | 257/680 |
| 2006/0260674 | A1 * | 11/2006 | Tran | 136/252 |
| 2008/0083881 | A1 * | 4/2008 | Gorrell et al. | 250/399 |

OTHER PUBLICATIONS

U.S. Appl. No. 11/881,402, Hyde et al.
U.S. Appl. No. 11/804,586, Hyde et al.
Atwater, Harry A.; Maier, Stefan; Polman, Albert; Dionne, Jennifer A.; Sweatlock, Luke; "The New "p-n Junction": Plasmonics Enables Photonic Access to the Nanoworld"; MRS Bulletin; Bearing a date of May 2005; pp. 385-389; vol. 30; located at : www.mrs.org/publications/bulletin; printed on May 12, 2006.

(Continued)

*Primary Examiner*—K. Cyrus Kianni

(57) ABSTRACT

A variety of structures, methods, systems, and configurations can support plasmons for logic.

20 Claims, 14 Drawing Sheets

OTHER PUBLICATIONS

Barnes, William L.; Dereux, Alain; Ebbesen, Thomas W.; "Surface Plasmon Subwavelength Optics"; Nature: Insight Review Articles; Bearing dates of 2003 and Aug. 14, 2003; pp. 824-830; vol. 424; Nature Publishing Group.

Boltasseva, Alexandra; Nikolajsen, Thomas; Leosson, Kristjan; Kjaer, Kasper; Larsen, Morten S.; Bozhevolnyi, Sergey I.; "Integrated Optical Components Utilizing Long-Range Surface Plasmon Polaritons"; Journal of Lightwave Technology; Bearing dates of May 21, 2004, 2005 and Jan. 2005; pp. 413-422; vol. 23, No. 1; IEEE.

Bozhevolnyi, Sergey I.; Volkov, Valentyn S.; Devaux, Eloise; Laluet, Jean-Yves; Ebbesen, Thomas W.; "Channel Plasmon Subwavelength Waveguide Components Including Interferometers And Ring Resonators"; Nature—Letters; Bearing dates of Mar. 2006 and 2006; pp. 508-511; vol. 440, No. 23, Nature Publishing Group.

Bozhevolnyi, Dr. Sergey I.; Shalaev, Vladimir M.; "Nanophotonics With Surface Plasmons—Part I"; Photonics Spectra; Bearing a date of Jan. 2006; pp. 58-66 [7 total pages included—some intervening advertisement pages intentionally omitted].

Brongersma, Mark L.; Hartmen, John W.; Atwater, Harry A.; "Electromagnetic Energy Transfer and Switching in Nanoparticle Chain Arrays Below The Diffraction Limit"; Rapid Communications—Physical Review B; Bearing dates of Sep. 27, 2000 and Dec. 15, 2000 and 2000; pp. R16356-R16359; vol. 62, No. 24; The American Physical Society.

Kik, Pieter G.; Martin, Andrea L.; Maier, Stefan A.; Atwater, Harry A.; "Metal Nanoparticle Arrays for Near Field Optical Lithography"; Properties of Metal Nanostructures; bearing a date of 2002; pp. 7-13; Proceedings of SPIE; vol. 4810.

Kittel, Charles; "Introduction to Solid State Physics"; Bearing dates of 2000-2004, Nov. 2004 and 2005-2006; pp. 1-704; $8^{th}$ Edition, ISBN: 0-471-41526-X; John Wiley & Sons, Inc.

Krasavin, A.V.; Zayats, A.V.; Zheludev, N.I.; "Active Control of Surface Plasmon—Polariton Waves"; Journal of Optics A: Pure And Applied Optics; Bearing date of Jun. 1, 2004, Oct. 19, 2004, Jan. 20, 2005, and 2005; pp. S85-S89; vol. 7; IOP Publishing Ltd.

Leroux, Yann R.; Lacroix, Jean Christophe; Chane-Ching, Kathleen I.; Fave, Claire; Félidj, Nordin; Lévi, Georges; Aubard, Jean, Krenn, Joachim R.; Hohenau, Andreas; "Conducting Polymer Electrochemical Switching as a Easy Means for Designing Active Plasmonic Devices"; J.Am. Chem. Soc.; Bearing dates of Jul. 22, 2005 and 2005; pp. 16022-16023; vol. 127; No. 46; American Chemical Society.

Maier, Stefan A.; Barclay, Paul E.; Johnson, Thomas J.; Friedman, Michelle D.; Painter, Oskar; "Low-Loss Fiber Accessible Plasmon Waveguide for Planar Energy Guiding and Sensing"; Applied Physics Letters; Bearing dates of Dec. 1, 2003, 2004, Mar. 22, 2004, May 3, 2004 and May 17, 2004; pp. 3990-3992; vol. 84, No. 20; American Institute of Physics.

Panoiu, N.-C.; Osgood, R.M., Jr.; "Subwavelength Nonlinear Plasmonic Nanowire"; Nano Letters; Bearing dates of 2004, Sep. 17, 2004, Oct. 21, 2004, and Nov. 10, 2004; pp. 2427-2430; vol. 4, No. 12; American Chemical Society.

Salerno, M.; Krenn, J.R.; Lamprecht, B.; Schider, G.; Ditlbacher, H.; Félidj, N.; Leitner, A.; Aussenegg, F.R.; "Plasmon Polaritons in Metal Nanostructures: The Optoelectronic Route to Nanotechnology"; Opto-Electronics Review; Bearing a date of 2002; pp. 217-224; vol. 10, No. 3; COSiW SEP, Warsaw.

* cited by examiner

FIG. 12

Light incident/not incident on A: A=0/1
Light incident/not incident on B: B=0/1
Light not detected/detected at OUT: OUT=0/1

| A | B | OUT |
|---|---|-----|
| 0 | 0 | 0 |
| 1 | 0 | 0 |
| 0 | 1 | 0 |
| 1 | 1 | 1 |

Light incident/not incident on A: A=0/1
Light incident/not incident on B: B=0/1
Light not detected/detected at OUT: OUT=0/1

| A | B | OUT |
|---|---|-----|
| 0 | 0 | 0 |
| 0 | 1 | 1 |
| 1 | 0 | 1 |
| 1 | 1 | 1 |

1400

PLASMON GATE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation-in-part of U.S. patent application Ser. No. 11/471,288, entitled Plasmon Switch, naming Roderick A. Hyde, Edward K. Y. Jung; Nathan P. Myhrvold, John Brian Pendry, Clarence T. Tegreene, and Lowell L. Wood, Jr. as inventors, filed 19 Jun. 2006 now U.S. Pat. No. 7,366,373, which is currently co-pending, or is an application of which a currently co-pending application is entitled to the benefit of the filing date.
2. For purposes of the USPTO extra-statutory requirements, the present application constitutes a continuation-in-part of U.S. patent application Ser. No. 11/649,710, entitled Plasmon Gate, naming Roderick A. Hyde, Edward K. Y. Jung; Nathan P. Myhrvold, John Brian Pendry, Clarence T. Tegreene, and Lowell L. Wood, Jr. as inventors, filed 04 Jan. 2007, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

In one embodiment, a method of controlling energy propagation comprises guiding energy at a first plasmon frequency along a first path, blocking the guided energy at the first plasmon frequency from propagating along the first path responsive to a first signal at a first time, blocking the guided energy at the first plasmon frequency from propagating along the first path responsive to a second signal, different from the first signal, at a second time, and receiving an output that is a function of the first signal and the second signal.

In another embodiment, a plasmon gate comprises a first plasmon guide extending from an input location to an output location, a first plasmon switch interposed at a first central location intermediate the input location and output location and responsive to a first signal, and a second plasmon switch interposed at a second central location intermediate the input location and output location and responsive to a second signal, wherein the first switch and the second switch are arranged to control plasmon propagation to the output location.

In another embodiment, a method comprises inputting a plasmon signal, selectively controlling the plasmon signal with a plurality of control signals, and outputting a plasmon signal having a distribution that is a function of the plurality of control signals.

In another embodiment, an apparatus comprises a plasmon input receptive to a first plasmon signal, a first control input receptive to a first control signal, a second control input receptive to a second control signal, and a plasmon output configured to output a second plasmon signal as a function of the first plasmon signal, the first control signal and the second control signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 12 is a table corresponding to FIG. 11.

FIG. 14 is a table corresponding to FIG. 13.

DETAILED DESCRIPTION

Figure 1:
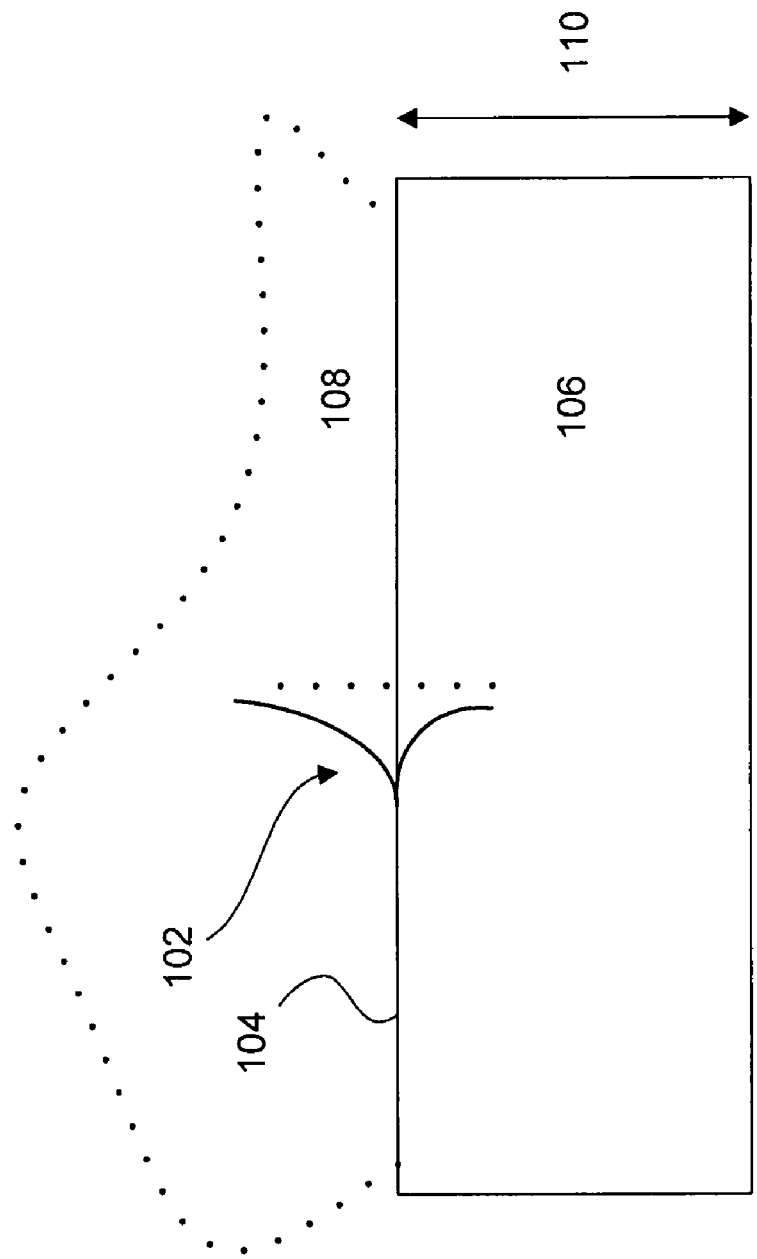
FIG. 1 is a schematic of a plasmon at a boundary.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Surface plasmons may exist on a boundary between two materials when the real parts of their dielectric constants $\epsilon$ and $\epsilon'$ have different signs, for example between a metal and a dielectric. FIG. 1 shows a plasmon 102 at a boundary 104 of a material 106 having a negative real dielectric constant, such as a metal. The material or structure 108 forming the boundary 104 with the material 106 may be: air, vacuum, or its equivalent; a substantially homogeneous dielectric material; or a different material or structure. The boundary 104, although shown as being substantially continuous and planar, may have a different shape. The plasmon 102, although shown as including substantially exponential functions with a field maximum at the boundary 104, may include only approximately exponential functions, may be described by a different function, and/or may have a field maximum someplace other than the boundary. Further, although the plasmon 102 is shown at a certain location on the boundary 104 for illustrative purposes, the spatial distribution of the plasmon 102 may be anything. Plasmons are described in C. Kittel, "INTRODUCTION TO SOLID STATE PHYSICS", Wiley, 2004, which is incorporated herein by reference.

In some embodiments the material thickness 110 may be smaller than the plasmon wavelength, as described in Alexandra Boltasseva, Thomas Nikolajsen, Krisjan Leosson, Kasper Kjaer, Morten S. Larsen, and Sergey I. Bozhevolnyi, "INTEGRATED OPTICAL COMPONENTS UTILIZING LONG-RANGE SURFACE PLASMON POLARITONS", Journal of Lightwave Technology, January, 2005, Volume 23, Number 1, which is incorporated herein by reference. Further, Boltasseva describes how a metal may be embedded in a dielectric to allow propagation of long-range surface plasmon polaritons, where the parameters of the metal [including thickness 110 and width (not shown)] may control the propagation of the plasmon.

Figure 2:
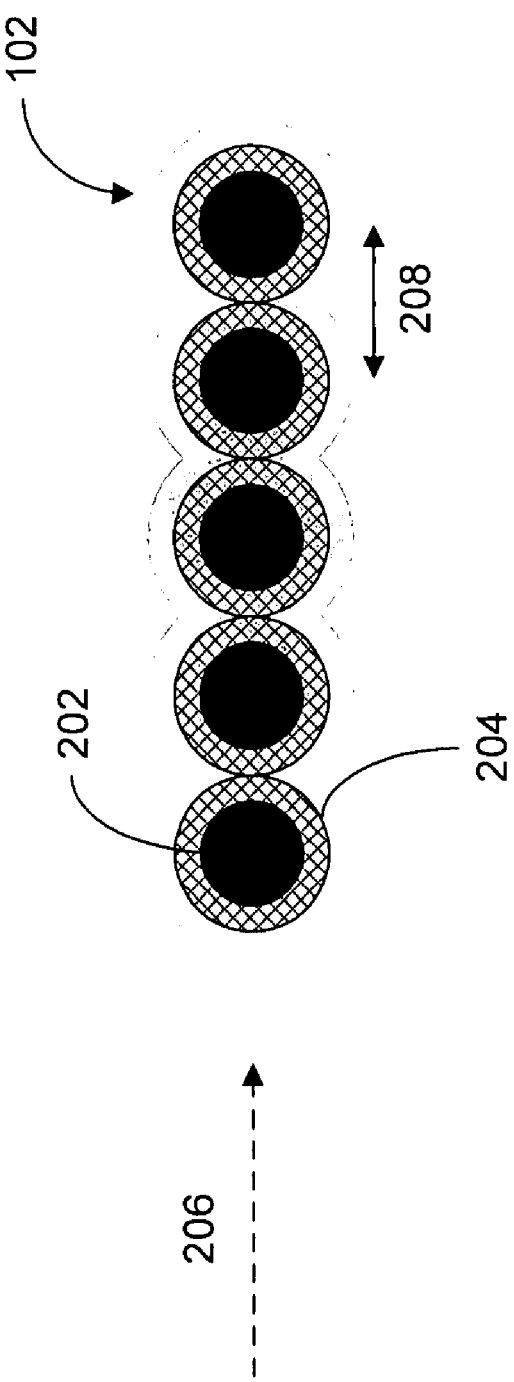
FIG. 2 is a schematic of an array of particles.

Particles 202 may be configured to support and guide surface plasmons, where the particles 202 shown in FIG. 2 are silver spheres. Particles supporting plasmons are described in M. Salerno, J. R. Krenn, B. Lamprecht, G. Schider, H. Ditlbacher, N. Felidj, A. Leitner, and F. R. Aussenegg, "PLASMON POLARITONS IN METAL NANOSTRUCTURES: THE OPTOELECTRONIC ROUTE TO NANOTECHNOLOGY", Opto-Electronics Review, 2002, Volume 10, Number 3, pages 217-222, which is incorporated herein by reference. Creation of plasmons on a particle in an electromagnetic field is described in P. G. Kik, A. L. Martin, S. A. Maier, and H. A. Atwater, "METAL NANOPARTICLE ARRAYS FOR NEAR FIELD OPTICAL LITHOGRAPHY", Proceedings of SPIE, 4810, 2002 which is incorporated herein by reference. FIG. 2 shows electromagnetic energy 206 incident on a chain of particles 202, where the particles 202 are coated with a nonlinear material 204, and the electromagnetic energy 206 couples to plasmons 102 on the particles 202. The plasmons 102 are shown having a finite extent in FIG. 2 for clarity and one skilled in the art will recognize that the spatial distribution of the plasmons 102 may fall off according to a power law away from the particles 202 and/or may have a different distribution than that shown in FIG. 2. Particles 202 may be configured on a substrate (not shown), as described in Stefan A. Maier, Paul E. Barclay, Thomas J. Johnson, Michelle D. Friedman, and Oskar Painter, "LOW-LOSS FIBER ACCESSIBLE PLASMON WAVEGUIDE FOR PLANAR ENERGY GUIDING AND SENSING", Applied Physics Letters, May 17, 2004, Volume 84, Number 20, Pages 3990-3992, which is incorporated herein by reference.

Particles 202 may be coated with nonlinear material 204, as described in N.-C. Panoiu and R. M. Osgood, Jr., "SUB-WAVELENGTH NONLINEAR PLASMONIC NANOWIRE", Nano Letters, Nov. 10, 2004, Volume 4, Number 12, Pages 2427-2430, which is incorporated herein by reference. In FIG. 2 all of the particles 202 are coated with a nonlinear material 204, however, in some embodiments only one particle may be coated with nonlinear material 204, or a different number of particles 202 may be coated with nonlinear material 204. Further, although FIG. 2 shows the particles 202 completely coated with nonlinear material 204, one or more particles 202 may only be partially coated with nonlinear material 204.

Although the particles 202 in FIG. 2 are shown as being substantially spherical, the particles may have a different shape that is configured to support plasmons. Further, although the particles 202 are shown as being substantially the same size, the particles 202 may vary in size, by design or by a randomized process of manufacturing the particles 202. Moreover, the particles need not be homogenous or even solid. Also, although the particles 202 are described as silver particles, particles 202 that support plasmons may comprise a different metal or a different material. Although the particles 202 are illustrated as having a spacing between particles 208 that is substantially constant, the spacing may vary and may be different from that shown in FIG. 2, and in some embodiments, the particles 202 may be touching or very nearly so.

Figure 3:
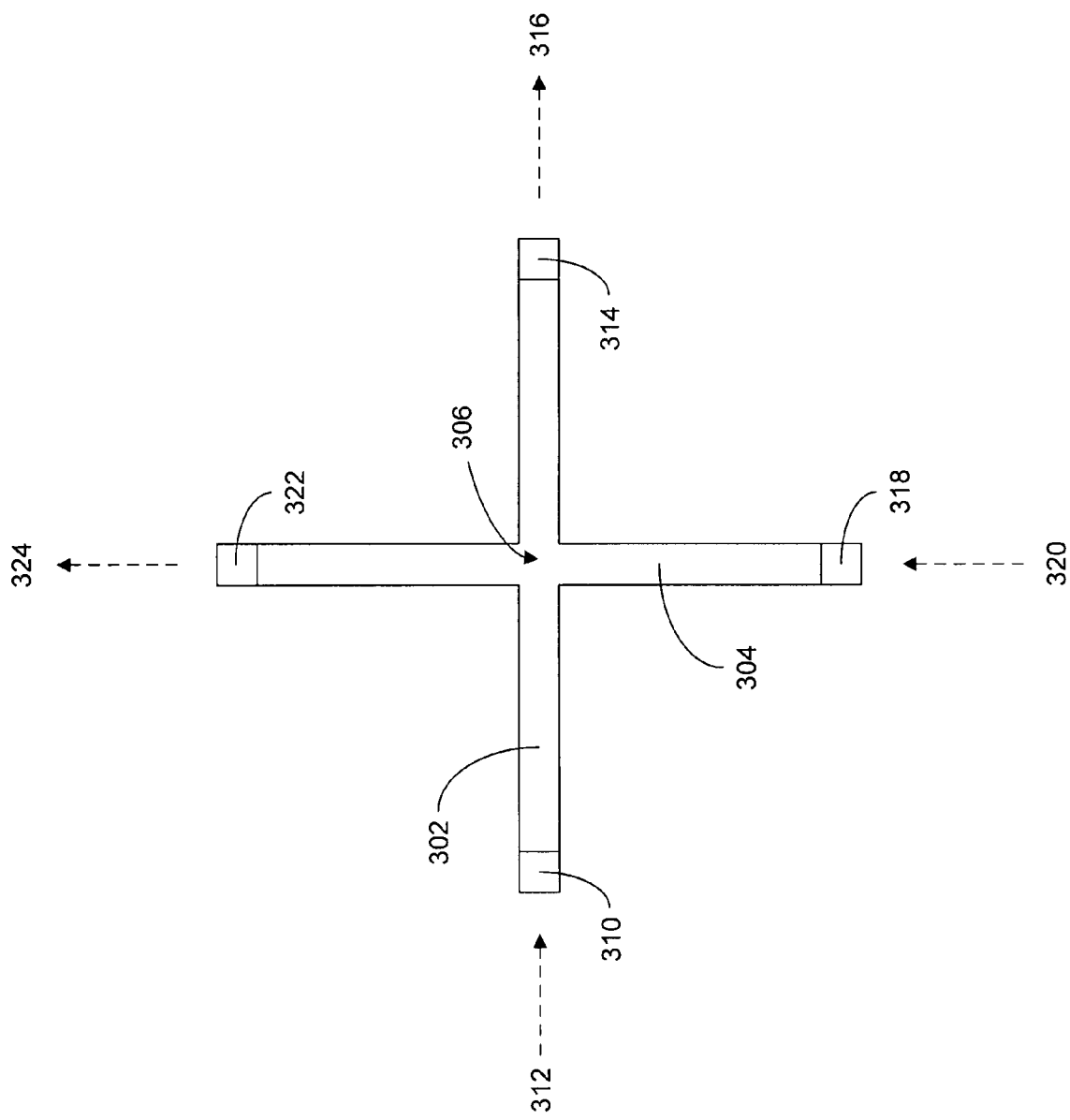
FIG. 3 is a schematic of a first path intersecting a second path.

FIG. 3 shows a top cross-sectional view of a first embodiment including a first path 302 for guiding energy at a first plasmon frequency, a second path 304 for guiding energy at a second plasmon frequency, where the first path 302 and the second path 304 form an intersection region 306 including a nonlinear material or other material configured to saturate in response to a plasmon that forms a first portion of the first path 302. The paths 302, 304 are boundaries 104 as described with respect to FIG. 1. An input coupling structure 310 is configured to convert incoming electromagnetic energy 312 into a plasmon 102 (shown in FIG. 1) that propagates along the first path 302, and an output coupling structure 314 is configured to convert a plasmon 102 propagating along the first path 302 into outgoing electromagnetic energy 316. Similarly, a second input coupling structure 318 is configured to convert incoming electromagnetic energy 320 into a plasmon 102 (shown in FIG. 1) that propagates along the second path 304, and a second output coupling structure 322 is configured to convert a plasmon 102 propagating along the second path 304 into outgoing electromagnetic energy 324. Electromagnetic energy 320 converted into a plasmon 102 propagating along the second path 304 can saturate the intersection region 306 and thus inhibit the propagation of a plasmon 102 through the intersection region 306 along the first path 302.

Although the embodiment in FIG. 3 is described such that the intersection region 306, when saturated, inhibits propagation of a plasmon 102 through the intersection region 306, in another embodiment the intersection region 306 may be configured to allow propagation of a plasmon 102 when it is saturated and inhibit or restrict propagation of a plasmon 102 when it is not saturated.

Some methods for coupling electromagnetic energy to a plasmon (and vice versa) that may be incorporated in an input and/or output coupling structure 310 and/or 314 are described in W. L. Barnes, A. Dereux, and T. W. Ebbesen, "SURFACE PLASMON SUBWAVELENGTH OPTICS", Nature, Volume 424, Aug. 14, 2003, 824-830, which is incorporated herein by reference. These methods include and are not limited to prism coupling, scattering from a topological defect on the surface on which the plasmon is to be generated, and periodic corrugation in the surface on which the plasmon is to be generated.

In some approaches the input and output coupling structures 310, 314, 318, 322 may be integral to the first and second paths 302, 304, while in other approaches, the first and second paths 302, 304 may be arranged primarily for guiding and separate structures may form the input and output coupling structures 310, 314, 318, 322.

Figure 4:
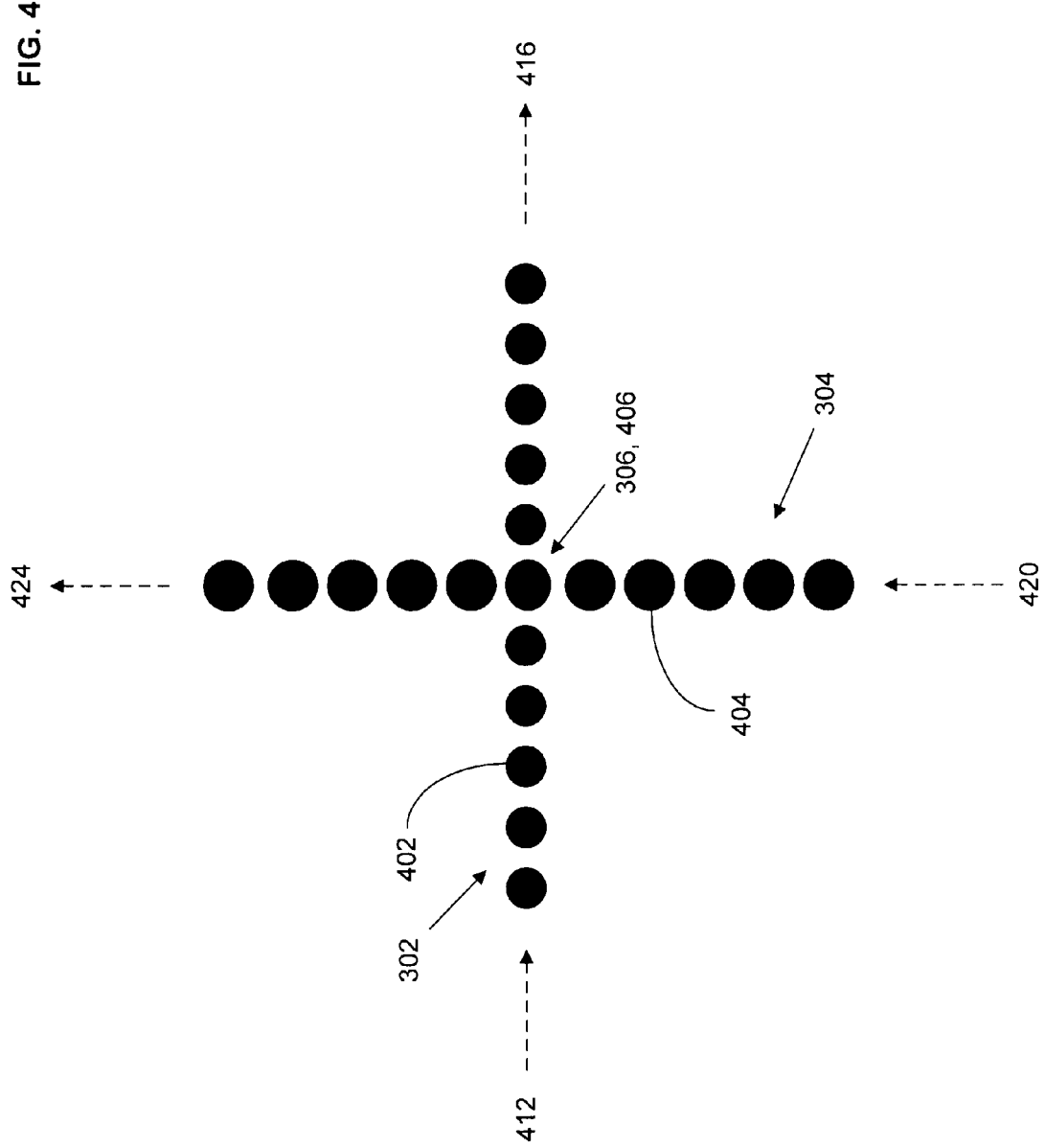
FIG. 4 is a schematic of a first path intersecting a second path.

FIG. 4 shows a top cross-sectional view of another embodiment including a first path 302 for guiding energy at a first plasmon frequency, a second path 304 for guiding energy at a second plasmon frequency, where the first path 302 and the second path 304 form an intersection region 306 that forms a first portion of the first path 302. In this case, particles 402 having a first size form the first path 302, particles 404 having a second size form the second path 304, and an elliptical particle 406 forms the intersection region 306. The particle 406 forming the intersection region 306 is configured to resonate at both the first plasmon frequency and the second plasmon frequency. In this case the intersection region 306 includes a single elliptical particle 406 configured to resonate at two frequencies, however, other assemblies may resonate at two or more frequencies, including triangular particles, assemblies of two or more particles, or a different configuration. Further, other embodiments allow the first path 302 to guide energy at a first plasmon frequency and the second path 304 to guide energy at a second plasmon frequency, for example, by varying the size, shape, material, and/or other parameters of the particles 402, 404.

Incoming electromagnetic energy 412 is converted into a plasmon 102 (shown on particles 202 in FIG. 2) that propagates along the first path 302. Plasmons 102 that pass through the intersection region 306 are then converted into outgoing electromagnetic energy 416. Similarly, incoming electromagnetic energy 420 is converted into a plasmon 102 that propagates along the second path 304. Plasmons 102 that pass through the intersection region 306 are then converted into outgoing electromagnetic energy 424. Electromagnetic energy 420 converted into a plasmon 102 propagating along the second path 304 can saturate the elliptical particle 406. The saturated elliptical particle 406 does not support propagation of plasmon energy, and thus inhibits propagation of the plasmon 102 through the intersection region 306 along the first path 302.

The embodiment in FIG. 4 is shown having paths 302, 304 with different size particles 402, 404, however in some embodiments the paths 302, 304 may have substantially the same size particles 402, 404. Further, although the embodiment is described such that plasmon propagation along the second path 304 blocks plasmon propagation along the first path 302, the reverse may be the case, where plasmon propagation along the first path 302 blocks plasmon propagation along the second path 304.

The embodiment in FIG. 4 is further described such that plasmons propagating along one path and saturating the particle 406 forming the intersection region 306 block plasmons from propagating along a different path. However, in some embodiments plasmons propagating along one path may block only a portion of the plasmon energy propagating along a different path such that the amount of plasmon energy propagating on one path determines the amount of plasmon energy that may propagate on the other path. In such an approach, the relationship between the amount of plasmon energy along the second path 304 and the amount of plasmon energy that propagates along the first path 302 is not necessarily binary. That is, the amount of plasmon energy that passes the elliptical particle 406 can be an analog function of the amount of plasmon energy arriving at the elliptical particle 406 along the second path 304.

Figure 5:
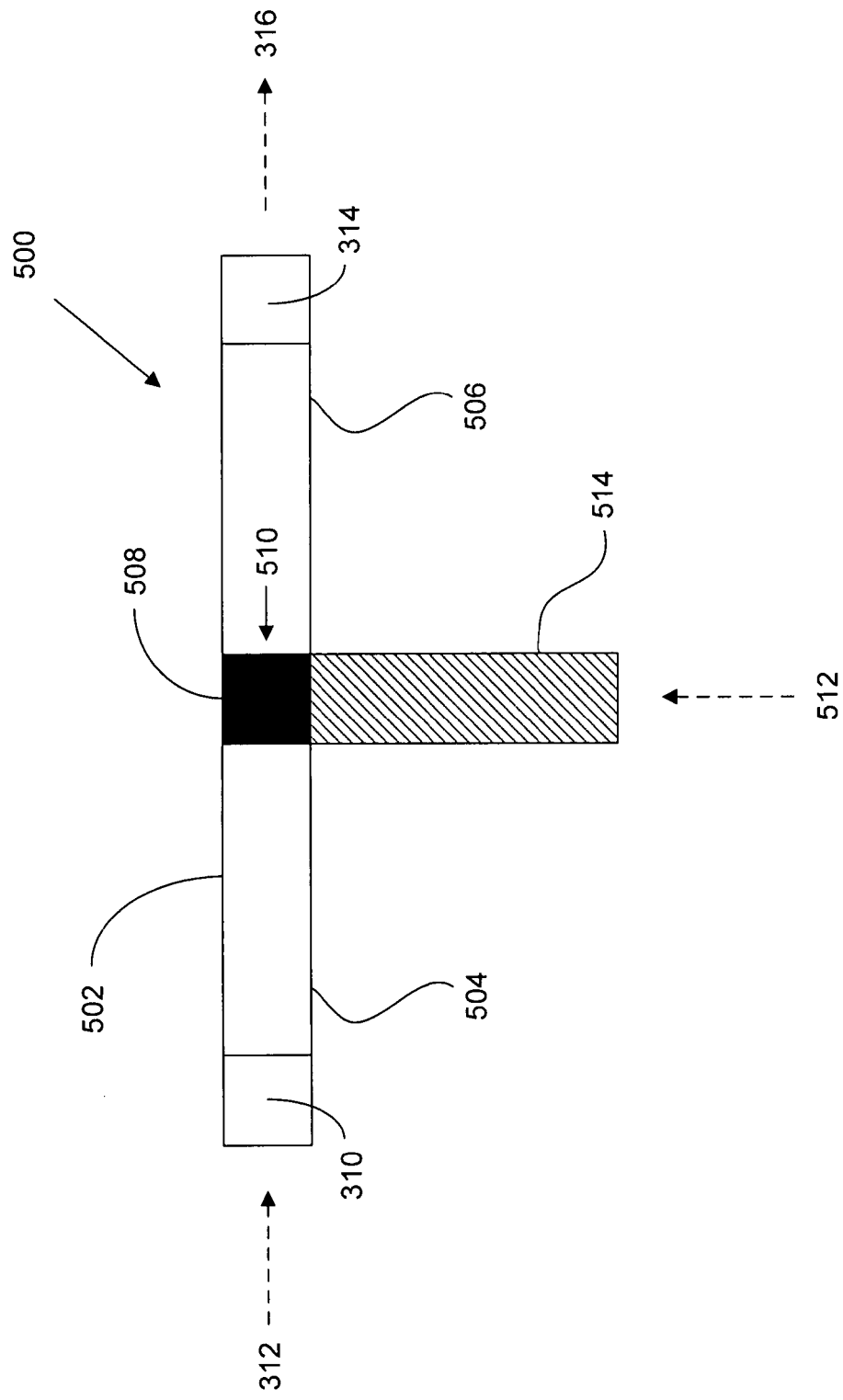
FIG. 5 is a schematic of a top cross-sectional view of a plasmon logic element.

FIG. 5 shows a top cross-sectional view of an embodiment of a plasmon logic element 500 including a first plasmon guide 502 extending from an input location 504 to an output location 506 and a first electromagnetically nonlinear structure 508 interposed at a first central location 510 (analogous to the intersection region 306 that forms a first portion of the first path 302) intermediate to the input location 504 and output location 506, where the first nonlinear structure 508 is responsive to electromagnetic energy 512 to control plasmon propagation past the first central location 510. An energy guiding structure 514 is configured to guide the electromagnetic energy 512 to the first central location 510. An input coupling structure 310 is configured to convert incoming electromagnetic energy 312 into a plasmon 102 (shown in FIG. 1) that propagates along the first plasmon guide 502, and an output coupling structure 314 is configured to convert a plasmon 102 propagating along the first plasmon guide 502 into outgoing electromagnetic energy 316.

In the embodiment shown in FIG. 5, the energy guiding structure 514 is an optical fiber configured to direct energy substantially in the optical frequency range to the first central location 510. In other embodiments, the type of energy guiding structure 514 may be determined by the frequency response of the first nonlinear structure 508. For example, the energy guiding structure may include an integrated optical waveguide, a set of particles, a carbon nanotube structure, a dielectric-dielectric interface, or any other appropriate structure that can guide the energy. In one embodiment, the energy guiding structure 514 may be configured to carry electromagnetic energy in the form of a plasmon 102. In another embodiment, the energy guiding structure 514 can be removed and electromagnetic energy 512 can be directed toward the first nonlinear structure 508 through freespace or another transmissive medium. Or, electromagnetic energy 512 can emitted substantially adjacent to the first nonlinear structure, with a light emissive or plasmon emissive structure, such as a laser or another known form of locally emitting energy at the appropriate frequency.

Figure 6:
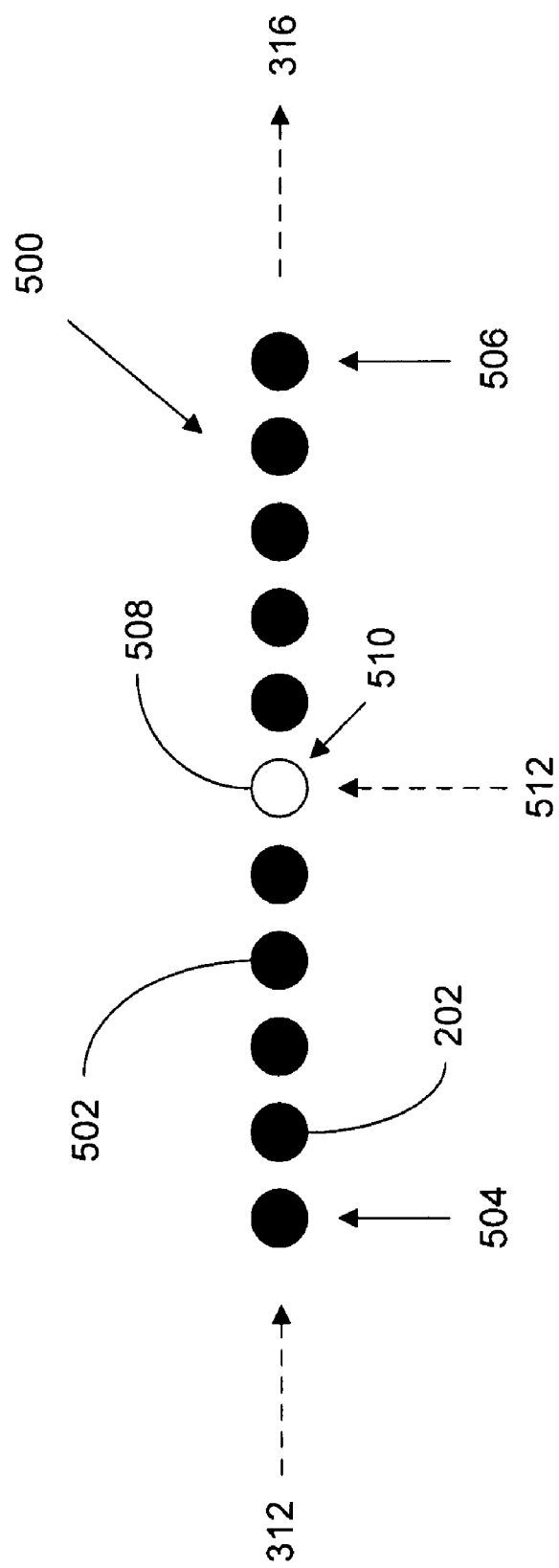
FIG. 6 is a schematic of a top cross-sectional view of a plasmon logic element including an array of particles.

FIG. 6 shows a top cross-sectional view of another embodiment of a plasmon logic element 500 including a first plasmon guide 502 extending from an input location 504 to an output location 506 and a first electromagnetically nonlinear structure 508 interposed at a first central location 510 intermediate to the input location 504 and output location 506, where the first nonlinear structure 508 is responsive to electromagnetic energy 512 to control plasmon propagation past the first central location. In the embodiment shown in FIG. 6, the first plasmon guide 502 includes an array of particles 202 and the electromagnetically nonlinear structure 508 is a metallic particle coated with nonlinear material as described with respect to FIG. 2. However, in other embodiments the electromagnetically nonlinear structure 508 may be a different structure configured to support plasmons and to saturate under certain conditions.

Although the embodiment in FIG. 6 shows only one particle 508 including nonlinear material, more than one particle in the guide 502 may include a nonlinear material, as described with respect to FIG. 2. Further, other variations may include those described with respect to FIG. 2. In an embodiment where more than one particle in the guide 502 includes a nonlinear material, electromagnetic energy 512 incident on the guide 502 can select the first central location 510 on the guide 502 where plasmon propagation is controlled. Or, a second particle 202 in the guide 502 coated with a nonlinear material may function as a second electromagnetically nonlinear structure at a second central location (not shown), where plasmon propagation along the guide 502 may be controlled at both the first central location and the second central location.

Figure 7:
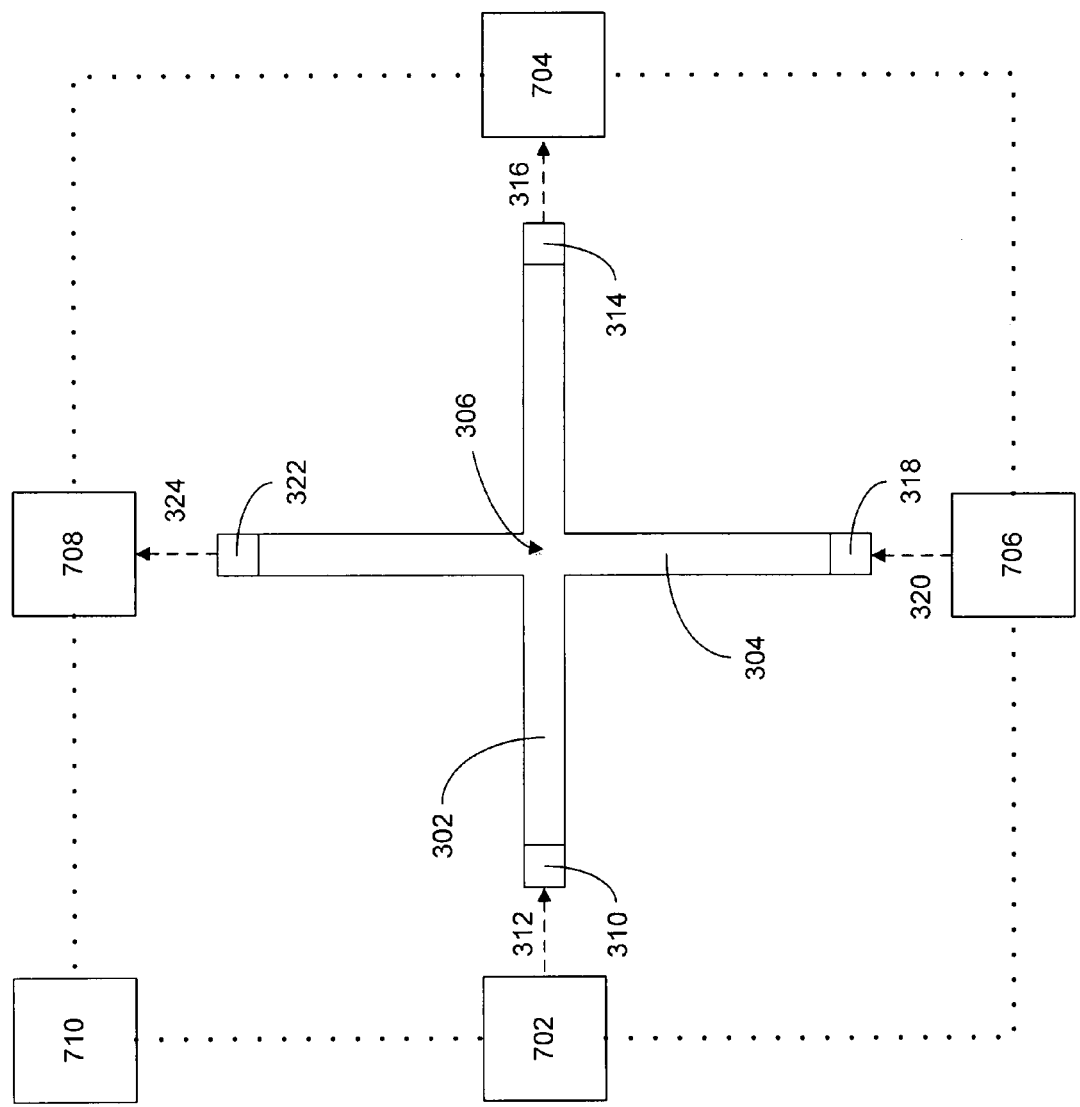
FIG. 7 is a schematic of a system including a plasmon logic element.

FIG. 7 shows a system including an embodiment similar to that in FIG. 3, where the system includes an energy generator 702 configured to produce energy. The input coupling structure 310 is configured to couple the energy from the energy generator 702 to a plasmon 102 (shown in FIG. 1). In one embodiment, the energy generator 702 may be a device configured to produce electromagnetic energy, such as a laser, and the input coupling structure 310 may include a converter configured to convert energy to a plasmon 102. Although the energy generator 702 is shown separate from the first path 302, in some embodiments the first path 302 may include the energy generator 702. Sources of electromagnetic radiation that may be included in the first path 302 are known to those skilled in the art, and may include a microcavity semiconductor laser such as that described in U.S. Pat. No. 5,825,799, entitled MICROCAVITY SEMICONDUCTOR LASER, to Seng-Tiong Ho, Daniel Yen Chu, Jian-Ping Zhang, and Shengli Wu, which is incorporated herein by reference.

FIG. 7 further includes the output coupling structure 314, where the output coupling structure 314 may include a converter configured to convert a plasmon 102 into a different form of energy such as electromagnetic energy, and/or a region arranged to output the energy. FIG. 7 further includes a detector 704, where the detector 704 may include a device configured to detect electromagnetic energy, such as a photodetector or other detector, or the detector 704 may be configured to detect a different kind of energy, depending on the type of energy output from the output coupling structure 314. Although FIG. 7 includes an input coupling structure 310 and an output coupling structure 314, in some embodiments these may not be included, for example, where the energy generator 702 is within the first path 302, the input coupling structure 310 may not be included.

FIG. 7 further includes a second energy generator 706, a second input coupling structure 318, a second output coupling structure 322, and a second detector 708. The second input coupling structure 318 is configured to couple the energy from the second energy generator 706 to a plasmon 102. In one embodiment, the second energy generator 706 may be a device configured to produce electromagnetic energy, such as a laser, and the second input coupling structure 318 may include a converter configured to convert energy to a plasmon 102. Although the second energy generator 706 is shown separate from the second path 304, in some embodiments the second path 304 may include the energy generator.

The second output coupling structure 322 may include a converter configured to convert a plasmon 102 into a different form of energy such as electromagnetic energy, and/or a region arranged to output the energy. The second detector 708 is configured to receive energy from the second output coupling structure 322 and may include a device configured to detect electromagnetic energy, such as a photodetector or other detector, or the second detector 708 may be configured to detect a different kind of energy, depending on the type of energy output from the second output coupling structure 322. Although FIG. 7 includes a second input coupling structure 318 and a second output coupling structure 322, in some embodiments these may not be included, for example, where the second energy generator 706 is within the second path 304, the second input coupling structure 318 may not be included.

FIG. 7 further includes a processor 710 operably connected to the energy generator 702, the detector 704, the second energy generator 706, and the second detector 708. The processor 710 may be connected directly to the elements 702, 704, 706, 708, and/or there may be intermediate devices. Further, there may be more than one processor 710. Although the processor 710 is shown only in FIG. 7, any of the embodiments may include a processor 710, where the processor 710 may be operably coupled to elements of the system, where the elements are not limited to those described above.

Although the processor of FIG. 7 is described with reference to FIG. 3, the corresponding structures, methods, systems, and apparatuses can be used in conjunction with any of the embodiments. Moreover, although the embodiment of FIG. 7 illustrates a single processors and a single generation, the structures, methods, systems, and apparatuses herein may include one or more energy generators 702, 706 and/or detectors 704, 708, and/or processor(s) 710. A processor may include electrical circuitry and/or other apparatuses for processing signals.

Figure 8:
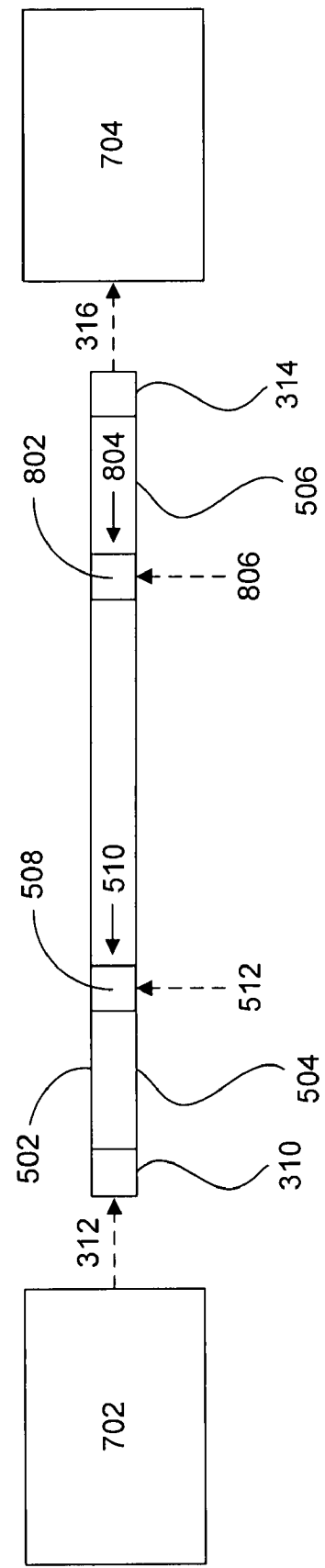
FIG. 8 is a schematic of a top cross-sectional view of a plasmon logic element.

FIG. 8 shows a top cross-sectional view of an embodiment similar to that of FIG. 5, further including a second electromagnetically nonlinear structure 802 interposed at a second central location 804 intermediate to the input location 504 and output location 506. Although the embodiment shown in FIG. 8 does not include the energy guiding structure 514, in other embodiments it may include an energy guiding structure 514 configured to guide energy to the first central location 510, and/or it may include a second energy guiding structure (not shown) configured to guide energy to the second central location 804.

As described with respect to FIG. 5, the input coupling structure 310 is configured to convert incoming electromagnetic energy 312 into a plasmon 102 (shown in FIG. 1), and the output coupling structure 314 is configured to convert a plasmon 102 into outgoing electromagnetic energy 316. In the embodiment shown in FIG. 8, the first and second central locations 510, 804 both include an electromagnetically nonlinear structure configured to saturate when electromagnetic energy 512 or 806 is incident on it. Thus a plasmon 102 may propagate along the first plasmon guide 502 through the first and second central locations 510, 804 when electromagnetic energy 512, 806 is not incident on the first and second central locations 510, 804, and when electromagnetic energy 512 or 806 is incident on one of the first and second central locations 510, 804, the plasmon 102 may not propagate through the first and/or second central locations 510, 804. Thus electromagnetic energy 512 or 806 incident on either the first or second central location 510 or 806 can inhibit electromagnetic energy 316 from being detected by the detector 704. Although the embodiment shown in FIG. 8 includes two electromagnetically nonlinear structures 508 and 802, the system may be configured with any number of these. Further, although the first and second central locations 510, 804 are shown as small, rectilinear portions of the first plasmon guide 502, they may be shaped differently depending upon the design considerations.

Figure 9:
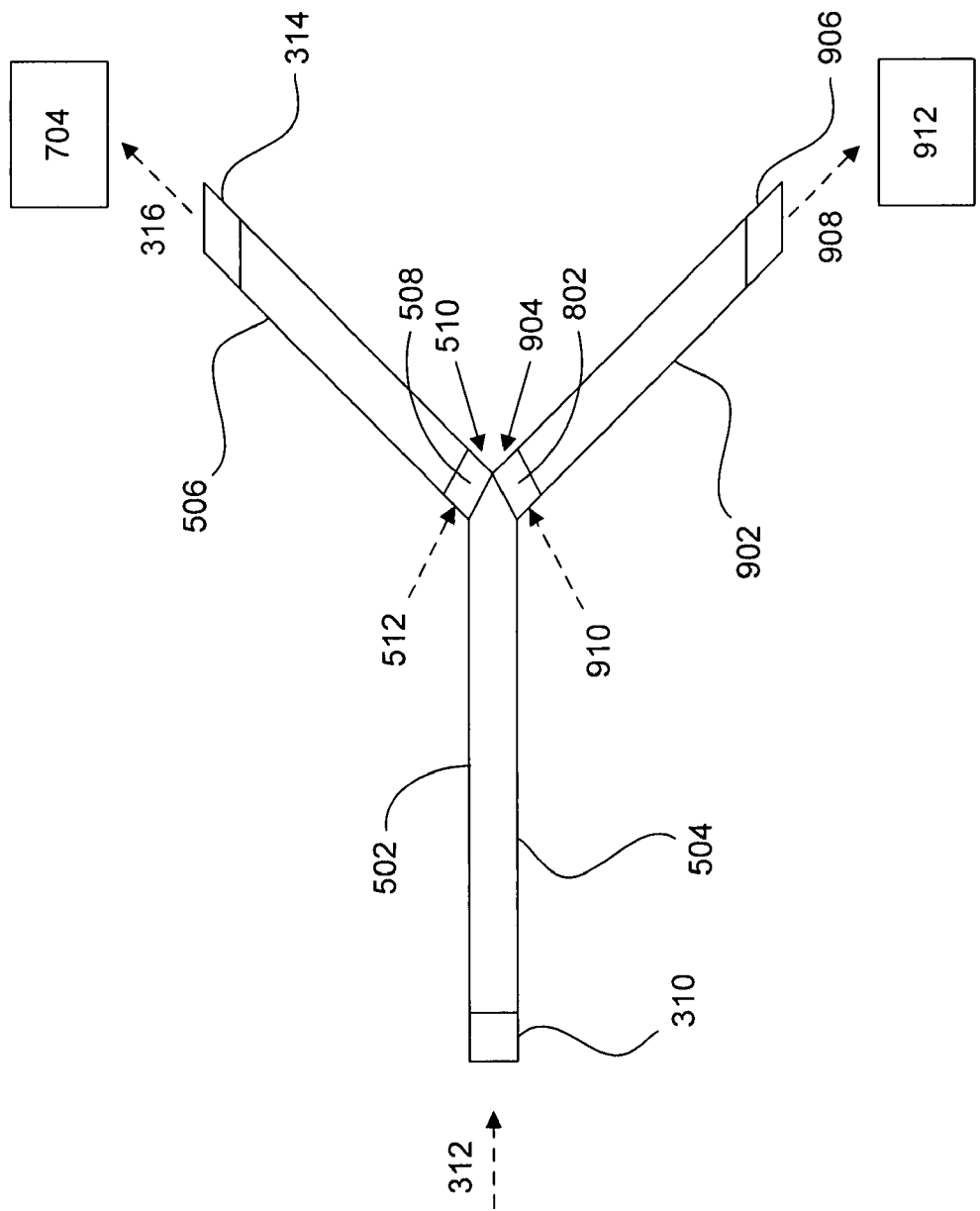
FIG. 9 is a schematic of a top cross-sectional view of a plasmon logic element.

FIG. 9 shows a top cross-sectional view of another embodiment similar to that in FIG. 5, further including a second electromagnetically nonlinear structure 802 and a second output location 902 located on one branch of a 'Y' shaped structure, wherein the second electromagnetically nonlinear structure 802 is interposed at a second central location 904 intermediate to the input location 504 and the second output location 902.

The input coupling structure 310 is configured to convert incoming electromagnetic energy 312 into a plasmon 102 (shown in FIG. 1), and the output coupling structures 314, 906 are each configured to convert a plasmon 102 into outgoing electromagnetic energy 316, 908.

In the embodiment shown in FIG. 9, the first and second central locations 510, 904 both include an electromagnetically nonlinear structure 508, 802 configured to saturate when electromagnetic energy 512 or 910 is incident on it. Thus a plasmon 102 may propagate along the first plasmon guide 502 through the first and second central locations 510, 904 when electromagnetic energy 512, 910 is not incident on the first and second central locations 510, 904. When electromagnetic energy 512 is incident on the first central location 510 the plasmon 102 may not propagate through the first central location 510, and thus electromagnetic energy 512 incident on the first central location 510 can inhibit electromagnetic energy 316 from being detected by the detector 704. Similarly, when electromagnetic energy 910 is incident on the second central location 904 the plasmon 102 may not propagate through the second central location 904, and thus electromagnetic energy 910 incident on the second central location 904 can inhibit electromagnetic energy 908 from being detected by the detector 912. Or, when electromagnetic energy 512, 910 is incident on both the first central location and the second central location 510 and 904 the plasmon 102 may not propagate through either the first or second central locations 510 or 904, and thus electromagnetic energy 512, 910 incident on the first and second central locations 510 and 904 can inhibit electromagnetic energy 316 and 908 from being detected by the detectors 704 and 912.

Although the embodiment shown in FIG. 9 includes two electromagnetically nonlinear structures 508 and 802, the system may be configured with any number of these. Further, although the first and second central locations 510, 904 are shown as small, rectilinear portions of the first plasmon guide 502, they may be configured in a different shape.

Figure 10:
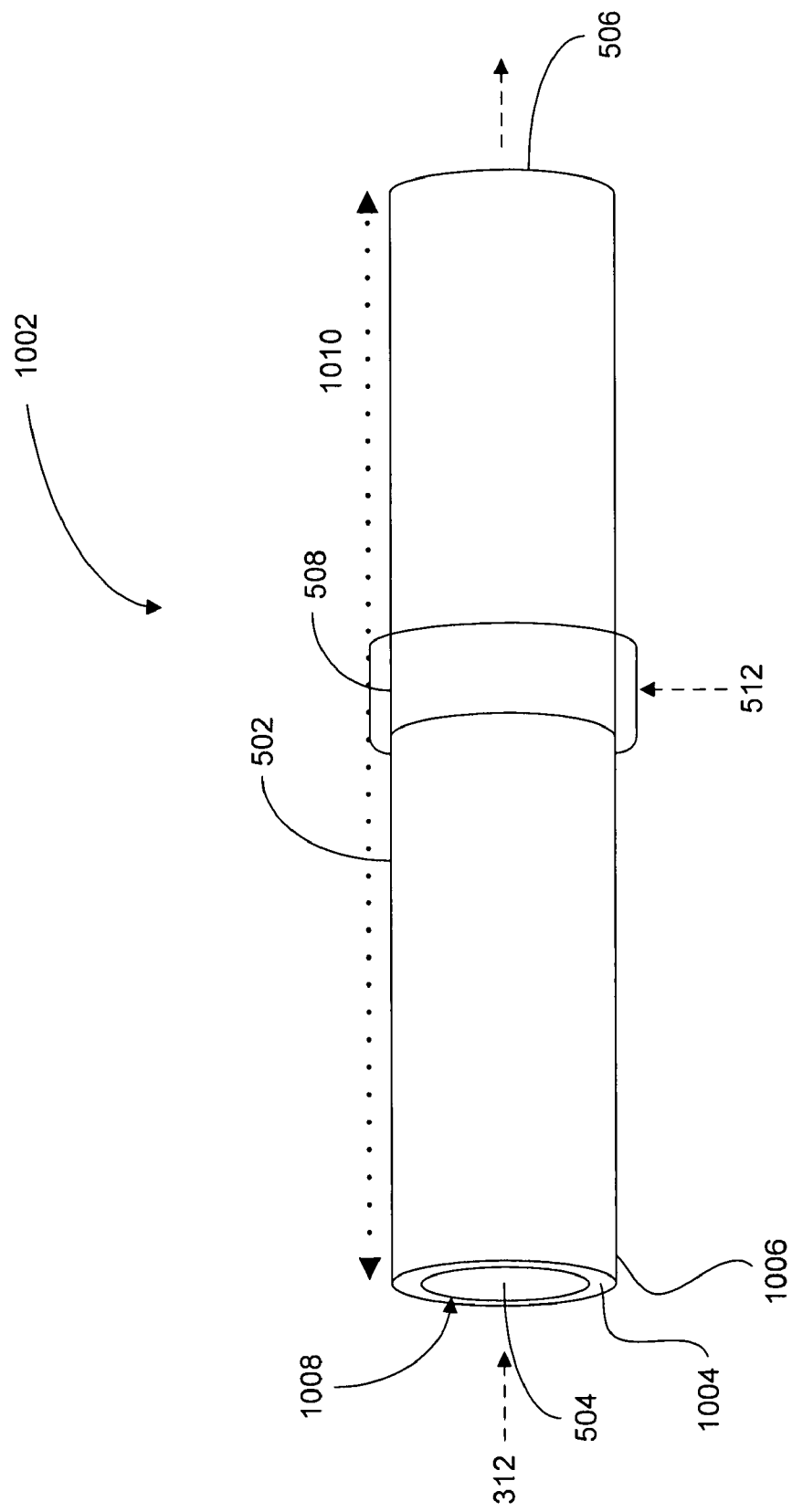
FIG. 10 is a schematic of a plasmon logic element configured on a fiber.

In the embodiment shown in FIG. 10, an electromagnetically nonlinear structure 508 is configured on a fiber 1002 having an outer conductive layer 1004, where the fiber 1002 forms a first plasmon guide 502 extending from an input location 504 to an output location 506, and where the first electromagnetically nonlinear structure 508 is interposed at a first central location 510 intermediate to the input location 504 and output location 506. The first electromagnetically nonlinear structure 508 is fabricated on the conductive layer 1004, where the first nonlinear structure 508 is responsive to electromagnetic energy 512 to control plasmon propagation past the first central location 510.

Electromagnetic energy 312 is coupled into and propagates in the fiber 1002 and couples to an evanescent wave in the conductive layer 1004, which couples to a plasmon 102 (shown in FIG. 1) on an outer surface 1006 of the conductive layer 1004. The conductive layer 1004 may include a high conductivity metal such as silver, gold, or copper, or it may be another type of metal or conductive material. Metal-coated fibers are known to those skilled in the art and various methods exist for coating a fiber with metal, including vacuum evaporation and sputtering.

Although the fiber 1002 in FIG. 10 has a substantially circular cross-section 1008 that remains substantially constant along the length 1010 of the fiber 1002, the fiber 1002 may have any shape, including but not limited to irregular cross-sections 1008 and/or cross-sections 1008 that vary along the length 1010.

Figure 11:
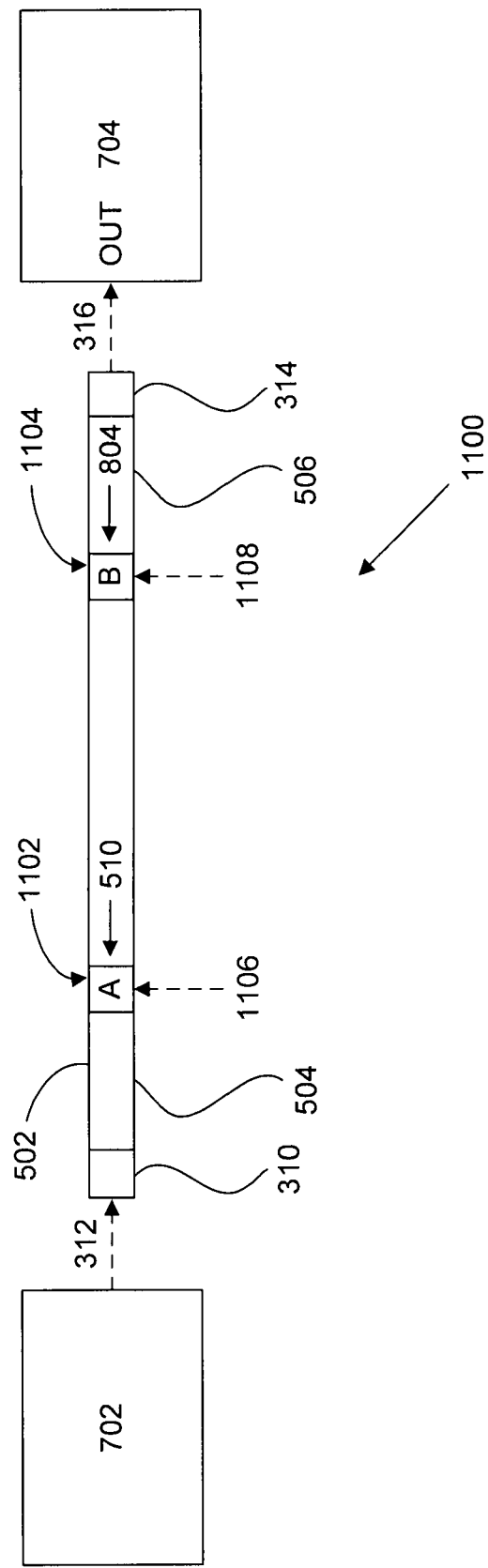
FIG. 11 is a schematic of a first embodiment of a plasmon gate.

A first embodiment of a plasmon gate 1100, shown in FIG. 11 (and similar to the embodiment shown in FIG. 8), comprises a first plasmon guide 502 extending from an input location 504 to an output location 506, a first plasmon switch 1102 interposed at a first central location 510 intermediate the input location 504 and output location 506 and responsive to a first signal 1106, and a second plasmon switch 1104 interposed at a second central location 804 intermediate the input location 504 and output location 506 and responsive to a second signal 1108, wherein the first switch 1102 and the second switch 1104 are arranged to control plasmon propagation to the output location 506. The input coupling structure 310 is configured to convert incoming electromagnetic energy 312 into a plasmon 102 (shown in FIG. 1), and the output coupling structure 314 is configured to convert a plasmon 102 into outgoing electromagnetic energy 316.

A table 1200 (truth table) shown in FIG. 12 further illustrates the operation of the plasmon gate 1100. In the example shown in FIG. 11, when the first signal 1106 is incident on the first plasmon switch 1102, a plasmon 102 is inhibited from passing through the switch 1102, representing a '0' in the table 1200. When the first signal 1106 is not incident on the first plasmon switch 1102, a plasmon 102 may propagate through the switch 1102, representing a '1' in the table 1200.

Similarly, when the second signal 1108 is incident on the second plasmon switch 1104, a plasmon 102 is inhibited from passing through the switch 1104, representing a '0' in the table 1200, and when the second signal 1108 is not incident on the second plasmon switch 1104, a plasmon 102 may propagate through the switch 1104, representing a '1' in the table 1200.

Thus a plasmon 102 may propagate along the first plasmon guide 502 through the first and second plasmon switches 1102, 1104 when a signal 1106, 1108 is not incident on the switches 1102, 1104, allowing electromagnetic energy 316 to be detected by the detector 704, represented by a '1' in the 'OUT' column of the table 1200. When a signal 1106 or 1108 is incident on one of the first and second plasmon switches 1102, 1104, the plasmon 102 may not propagate through the first and/or second plasmon switch 1102, 1104. Thus a signal 1106 or 1108 incident on either the first or second plasmon switch can inhibit electromagnetic energy 316 from being detected by the detector 704, represented by a '0' in the 'OUT' column of the table 1200.

Figure 13:
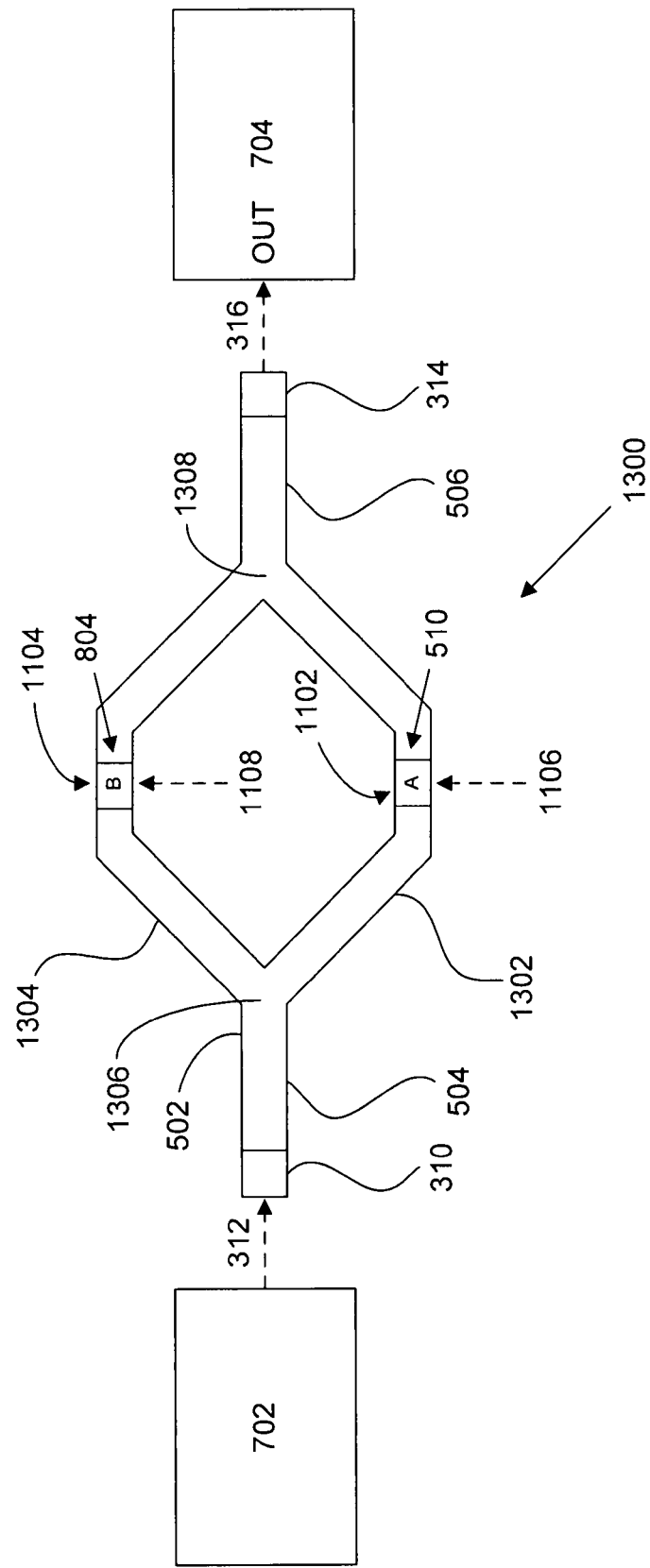
FIG. 13 is a schematic of a second embodiment of a plasmon gate.

In a second embodiment of a plasmon gate 1300, shown in FIG. 13, the first plasmon guide 502 extends from an input location 504 to an output location 506 and is arranged to route plasmon energy into a first branch 1302 and a second branch 1304 at a first intersection location 1306. The first branch 1302 includes the first plasmon switch 1102 responsive to a first signal 1106 at a first central location 510 and the second branch 1304 includes the second plasmon switch 1104 responsive to a second signal 1108 at a second central location 804, wherein the first switch 1102 and the second switch 1104 are arranged to control plasmon propagation to the output location 506. The first plasmon guide 502 is arranged to join plasmon energy from the first branch 1302 and the second branch 1304 at a second intersection location 1308. The input coupling structure 310 is configured to convert incoming electromagnetic energy 312 into a plasmon 102 (shown in FIG. 1), and the output coupling structure 314 is configured to convert a plasmon 102 into outgoing electromagnetic energy 316. Although FIG. 13 is shown having two branches 1302, 1304 and two plasmon switches 1102, 1104, other embodiments may include three or more branches and/or three or more switches, where each switch may be on a different branch or two or more switches may be on a single branch.

A table 1400 (truth table) shown in FIG. 14 further illustrates the operation of the plasmon gate 1300. When the first signal 1106 is incident on the first plasmon switch 1102, a plasmon 102 is inhibited from passing through the switch 1102, representing a '0' in the table 1400. When the first signal 1106 is not incident on the first plasmon switch 1102, a plasmon 102 may propagate through the switch 1102, representing a '1' in the table 1200.

Similarly, when the second signal 1108 is incident on the second plasmon switch 1104, a plasmon 102 is inhibited from passing through the switch 1104, representing a '0' in the table 1200, and when the second signal 1108 is not incident on the second plasmon switch 1104, a plasmon 102 may propagate through the switch 1104, representing a '1' in the table 1400.

Thus, a plasmon 102 may propagate along the first plasmon guide 502 through the first and second plasmon switches 1102, 1104 when a signal 1106, 1108 is not incident on the switches 1102, 1104, allowing electromagnetic energy 316 to be detected by the detector 704, represented by a '1' in the 'OUT' column of the table 1400. When a signal 1106 or 1108 is incident on one of the first and second plasmon switches 1102, 1104, the plasmon 102 may propagate through the other plasmon switch 1102, 1104. For example, when a signal 1106 is incident on the first plasmon switch 1102, a plasmon 102 may not propagate through the first plasmon switch 1102, but it may propagate through the second plasmon switch 1104, allowing electromagnetic energy 316 to be detected by the detector 704, represented by a '1' in the 'OUT' column of the table 1400. A signal 1106 or 1108 incident on both the first or second plasmon switch can inhibit electromagnetic energy 316 from being detected by the detector 704, represented by a '0' in the 'OUT' column of the table 1400.

With regard to the embodiments shown in FIGS. 11 and 13, the input coupling structure 310 is shown as being receptive to electromagnetic energy 312, however in other embodiments the input coupling structure 310 may be receptive to a different kind of energy, for example, plasmon energy. Similarly, the output coupling structure 314 is shown as being configured to output electromagnetic energy 316, but in other embodiments the output coupling structure 314 may be configured to output a different kind of energy, for example, plasmon energy and/or electromagnetic energy.

The first signal 1106 and/or the second signal 1108 in FIGS. 11 and 13 may include electromagnetic energy, plasmon energy, and/or a different form of energy, depending on the switches 1102, 1104. The first and/or second plasmon switch 1102, 1104 may include an electromagnetically non-linear structure, as described, for example, with respect to FIG. 3. The first plasmon guide 502 may be arranged substantially in a single plane or it may be configured in a non-planar arrangement.

Although the embodiments shown in FIGS. 11 and 13 do not include an energy guiding structure 514, other embodiments may include one or more energy guiding structures 514 configured to guide energy including the first and/or second signal 1106, 1108 to the first and/or second plasmon switch 1102, 1104.

Although FIGS. 11 and 13 show substantially linear guides, in other embodiments the first plasmon guide 502 may include at least one particle supportive of plasmon energy, as shown in FIGS. 2, 4 and 6.

Although the configuration of the gates 1100 and 1300 represented by tables 1200 and 1400 include switches 1102, 1104 that are represented by a '0' when a signal 1106 or 1108 is incident on them and by a '1' when a signal 1106 or 1108 is not incident on them, the switches may be configured such that a signal 1106 or 1108 incident on them is represented by a '1' and a signal 1106 or 1108 not incident on them is represented by a '0', and one skilled in the art may select and configure switches to produce a gate having a desired functional dependence. Further, although the tables 1200 and 1400 represent functions that are substantially constant in time, in other embodiments gates 1100, 1300 may be configured such that they are represented by functions that vary as a function of time. For example, in one embodiment, the switches 1102, 1104 may be configured to be responsive to a time-varying signal (not shown) such as a time-varying electromagnetic signal, electric or magnetic field, mechanical stress or strain, or a different time-varying stimulus, where the time-varying signal changes the properties of the switch as a function of time.

Although the embodiments shown in FIGS. 11 and 13 each include two plasmon switches 1102, 1104, other embodiments may have different numbers of switches. Further, although the first and second central locations 510, 804 are shown as small, rectilinear portions of the first plasmon guide 502, they may be shaped differently depending upon the design considerations.

In one embodiment a method of controlling energy propagation comprises guiding energy at a first plasmon frequency along a first path (or first plasmon guide 502), blocking the guided energy at the first plasmon frequency from propagating along the first path 502 responsive to a first signal 1106 at a first time, blocking the guided energy at the first plasmon frequency from propagating along the first path 502 responsive to a second signal 1108, different from the first signal 1106, at a second time, and receiving an output (for example, the outgoing electromagnetic energy 316) that is a function of the first signal 1106 and the second signal 1108. The second time may follow the first time, may be substantially the same as the first time, or may precede the first time. The embodiment may further comprise guiding energy at a second plasmon frequency along the first path 502.

The method may further comprise, at a first location (or first intersection location 1306) on the first path 502, directing a first portion of the energy at the first plasmon frequency into a first branch 1302, directing a second portion of the energy at the first plasmon frequency into a second branch 1304, and/or combining the first portion of the energy at the first plasmon frequency from the first branch 1302 and the second portion of the energy at the first plasmon frequency from the second branch 1304 at a second location (or second intersection location 1308) on the first path. The method may further comprise applying the first signal 1106 to the first branch 1302 and/or applying the second signal 1108 to the second branch 1304.

The method may further comprise coupling electromagnetic energy to the first path 502, generating the electromagnetic energy, coupling plasmon energy to the first path 502, generating the plasmon, and/or generating a plasmon along the first path. The method may further comprise generating the first and/or second signal 1106, 1108, and/or guiding the first and/or second signal 1106, 1108. The method may further comprise detecting, storing, and/or sending the output 316.

Blocking the guided energy at the first plasmon frequency from propagating along the first path 502 responsive to a first signal 1106 may include saturating a first portion of the first path (or first central location 510) with the first signal 1106 and, similarly, blocking the guided energy at the first plasmon frequency from propagating along the first path 502 responsive to a second signal 1108 may include saturating a second portion of the first path (or second central location 804) with the second signal 1108.

In one embodiment, a method comprises inputting a plasmon signal, selectively controlling the plasmon signal with a plurality of control signals (a first signal 1106 and a second signal 1108), and outputting a plasmon signal having a distribution that is a function of the plurality of control signals. The distribution may be a spatial distribution, a temporal distribution, or a different kind of distribution. It may be a function of the input plasmon signal, where the function may be substantially described by a table such as those in FIGS. 12 and 14 and/or may vary in time. The method may comprise generating at least one of the plurality of control signals 1106, 1108, where at least one of the plurality of control signals 1106, 1108 may include plasmon energy and/or at least one of the plurality of control signals may include electromagnetic energy.

In one embodiment, an apparatus such as the plasmon gate 1100 comprises a plasmon input (or input location 504) receptive to a first plasmon signal, a first control input (or first plasmon switch 1102) receptive to a first control signal (the first signal 1106), a second control input (or second plasmon switch 1104) receptive to a second control signal (the second signal 1108), and a plasmon output (or output location 506) configured to output a second plasmon signal as a function of the first plasmon signal, the first control signal 1106 and the second control signal 1108. The embodiment may further comprise a third control input receptive to a third control signal, not shown. The first control input 1102 may be further receptive to a third control signal, also not shown. The function of the first plasmon signal, the first control signal 1106 and the second control signal 1108 is substantially described by a table such as the tables 1200 and 1400 in FIGS. 12 and 14, where the table may describe an OR gate, an AND gate, or a different kind of gate.

Although the embodiments described in FIGS. 1-14 are generally described such that saturation of a region and/or energy incident on a nonlinear material inhibits propagation of a plasmon 102 through the region and/or material, in other embodiments saturation of a region and/or energy incident on a nonlinear material may be configured to allow propagation of a plasmon 102, and no saturation of a region and/or energy not incident on a nonlinear material may be configured to inhibit and/or restrict propagation of a plasmon 102.

In this disclosure, references to "optical" elements, components, processes or other aspects, as well as references to "light" may also relate in this disclosure to so-called "near-visible" light such as that in the near infrared, infra-red, far infrared and the near and far ultra-violet spectrums. Moreover, many principles herein may be extended to many spectra of electromagnetic radiation where the processing, components, or other factors do not preclude operation at such frequencies, including frequencies that may be outside ranges typically considered to be optical frequencies.

Although FIGS. 1-14 show structures configured to transport energy over relatively short distances, in some embodiments structures may be configured to transport energy over very long distances of even thousands of kilometers or more. For example, referring to FIG. 10, an optical fiber may be configured to carry electromagnetic energy over a substantially large distance, and metal deposited on the fiber may convert energy from electromagnetic energy propagating in the fiber to plasmon energy propagating on the metal.

Applications of plasmons and logic systems including plasmons are wide ranging. For example, there may be situations, such as in optical fiber systems where all-optical switching is desired, where electromagnetic energy is converted to plasmons to do the switching and then converted back to electromagnetic energy.

Although the term "plasmon" is used to describe a state propagating at the boundary between two materials whose real parts of their dielectric constant $\epsilon$ and $\epsilon'$ have different signs, one skilled in the art may recognize that other terms may exist for this state, including, but not limited to, "surface plasmon" and/or "surface plasmon polariton".

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various embodiments described herein can be implemented, individually and/or collectively, by various types of electro-mechanical systems having a wide range of electrical components such as hardware, software, firmware, or virtually any combination thereof, and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A plasmon gate, comprising:
   a first plasmon guide extending from an input location to an output location;
   a first optical control guide electromagnetically proximate a first central location intermediate the input location and output location, and configured to guide a first optical control signal to the first central location;
   a first plasmon switch interposed at the first central location and responsive to the first optical control signal to selectively control plasmon propagation past the first central location;
   a second optical control guide electromagnetically proximate a second central location intermediate the input location and output location, and configured to guide a second optical control signal to the second central location; and
   a second plasmon switch interposed at the second central location and responsive to the second optical signal, wherein the first switch and the second switch are arranged to cooperatively control plasmon propagation to the output location.

2. The plasmon gate of claim 1 wherein the first plasmon switch includes an electromagnetically nonlinear structure that is nonlinearly responsive to the first optical control signal.

3. The plasmon gate of claim 1 wherein the second plasmon switch includes an electromagnetically nonlinear structure that is nonlinearly responsive to the second optical control signal.

4. The plasmon gate of claim 1 wherein the first plasmon guide is arranged substantially in a single plane.

5. The plasmon gate of claim 1 further comprising an input coupling structure at the input location.

6. The plasmon gate of claim 5 wherein the input coupling structure is receptive to plasmon energy.

7. The plasmon gate of claim 5 wherein the input coupling structure is receptive to electromagnetic energy.

8. The plasmon gate of claim 7 further comprising a converter arranged to convert electromagnetic energy to plasmon energy.

9. The plasmon gate of claim 1 further comprising an output coupling structure at the output location.

10. The plasmon gate of claim 9 wherein the output coupling structure is configured to output plasmon energy.

11. The plasmon gate of claim 9 wherein the output coupling structure is configured to output electromagnetic energy.

12. The plasmon gate of claim 11 further comprising a converter arranged to convert plasmon energy to electromagnetic energy.

13. The plasmon gate of claim 1 wherein the first plasmon guide includes at least one particle supportive of plasmon energy.

14. The plasmon gate of claim 1 wherein the first plasmon guide is arranged to route plasmon energy into a first branch and a second branch at a first intersection location.

15. The plasmon gate of claim 14 wherein the first central location includes the first intersection location.

16. The plasmon gate of claim 14 wherein the first branch includes the first central location and the second branch includes the second central location.

17. The plasmon gate of claim 16 wherein the first plasmon guide is arranged to join plasmon energy from the first branch and the second branch at a second intersection location.

18. The plasmon gate of claim 1 further comprising a third plasmon switch interposed at a third central location intermediate the input location and output location and responsive to a third signal, wherein the third plasmon switch is configured to control plasmon propagation to the output location with the first and second plasmon switches.

19. The plasmon gate of claim 1 further comprising a first energy guide arranged to guide energy to the first central location.

20. The plasmon gate of claim 1 further comprising a second energy guide arranged to guide energy to the second central location.

* * * * *